US009736693B2

(12) United States Patent
Eyal

(10) Patent No.: US 9,736,693 B2
(45) Date of Patent: Aug. 15, 2017

(54) SYSTEMS AND METHODS FOR MONITORING AN OPERATING SYSTEM OF A MOBILE WIRELESS COMMUNICATION DEVICE FOR UNAUTHORIZED MODIFICATIONS

(71) Applicant: MOTOROLA SOLUTIONS, INC., Schaumburg, IL (US)

(72) Inventor: Eilon Eyal, Galil Elyon (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/805,296

(22) Filed: Jul. 21, 2015

(65) Prior Publication Data
US 2017/0026840 A1  Jan. 26, 2017

(51) Int. Cl.
*H04M 1/66* (2006.01)
*H04W 12/08* (2009.01)
(Continued)

(52) U.S. Cl.
CPC ............ *H04W 12/08* (2013.01); *H04L 43/10* (2013.01); *H04L 63/1433* (2013.01);
(Continued)

(58) Field of Classification Search
USPC ................. 455/410–411, 418–419, 423–425, 455/550.1–553.1, 41.1–41.2
See application file for complete search history.

(56) References Cited

U.S. PATENT DOCUMENTS 5,469,569 A   11/1995  Grube et al.
8,306,571 B2  11/2012  Larsson
(Continued)

FOREIGN PATENT DOCUMENTS

WO   2004114528   12/2004
WO   2013188830   12/2013

OTHER PUBLICATIONS

PCT/US2016/042090 International Search Report and Written Opinion of the International Searching Authority dated Sep. 30, 2016 (11 pages).

*Primary Examiner* — Dai A Phuong
(74) *Attorney, Agent, or Firm* — Michael Best & Friedrich LLP

(57) ABSTRACT

A method and system for securely monitoring an operating system of a mobile wireless communication device for unauthorized modifications. A secure application is provided on universal integrated circuit card of the mobile wireless communication device. The secure application is configured to control the wireless connectivity of the mobile wireless communication device, and communicate with a wireless communications network. A monitoring application is provided in a trusted sub-processor of the processor of the mobile wireless communication device. A secure communication link is established between the secure application and the monitoring application. A heartbeat token is generated by the trusted sub-processor, based on a modification status for the operating system and at least one system variable. The secure application receives the heartbeat token, and determines that an unauthorized software modification exists based on the heartbeat token. The secure application activates at least one countermeasure when an unauthorized software modification exists.

15 Claims, 3 Drawing Sheets

(51) Int. Cl.
*H04L 12/26* (2006.01)
*H04L 29/08* (2006.01)
*H04W 4/00* (2009.01)
*H04W 8/18* (2009.01)
*H04W 12/06* (2009.01)
*H04L 29/06* (2006.01)
*H04W 12/12* (2009.01)

(52) U.S. Cl.
CPC ............ *H04L 67/34* (2013.01); *H04W 4/003* (2013.01); *H04W 8/183* (2013.01); *H04W 12/06* (2013.01); *H04W 12/12* (2013.01)

(56) References Cited

U.S. PATENT DOCUMENTS

| | | |
|---|---|---|
| 8,925,089 B2 | 12/2014 | Sallam |
| 2005/0202803 A1* | 9/2005 | Mahalal ............ G06F 21/53 455/410 |
| 2007/0297609 A1 | 12/2007 | Adams et al. |
| 2009/0193230 A1* | 7/2009 | Findeisen ............ G06F 21/445 712/34 |
| 2012/0129492 A1* | 5/2012 | Mechaley, Jr. ...... G06Q 20/027 455/411 |
| 2012/0167162 A1 | 6/2012 | Raleigh et al. |
| 2013/0012168 A1* | 1/2013 | Rajadurai ............ H04L 9/0822 455/411 |
| 2014/0038563 A1* | 2/2014 | O'Leary ................ H04W 8/22 455/411 |
| 2014/0109234 A1* | 4/2014 | Lin .................... G06F 21/10 726/27 |
| 2014/0173733 A1 | 6/2014 | Ford |
| 2015/0039519 A1* | 2/2015 | Mattsson ............ G06Q 20/405 705/71 |
| 2015/0143456 A1* | 5/2015 | Raleigh ................ H04W 12/08 726/1 |
| 2015/0334107 A1* | 11/2015 | Chastain ............. H04L 63/0807 713/172 |
| 2015/0348022 A1* | 12/2015 | Khan .................. G06Q 20/385 705/71 |
| 2016/0014596 A1* | 1/2016 | Khan .................. H04L 63/0876 455/410 |
| 2016/0094987 A1* | 3/2016 | Jain ........................ H04M 1/66 455/411 |
| 2016/0205546 A1* | 7/2016 | Poon .................... H04W 12/06 455/419 |

* cited by examiner

SYSTEMS AND METHODS FOR MONITORING AN OPERATING SYSTEM OF A MOBILE WIRELESS COMMUNICATION DEVICE FOR UNAUTHORIZED MODIFICATIONS

BACKGROUND OF THE INVENTION

Mobile wireless communication devices (e.g., smart telephones, tablet computers, and portable radios) include operating systems that manage hardware and software resources of the mobile wireless communication devices. Operating systems also provide an interface between user applications (e.g., "apps") and the hardware and software resources. Most commonly, operating systems are pre-loaded on mobile wireless communication devices by a wireless service provider, prior to providing the device to an end user (sometime referred to as a "subscriber"). Most operating systems are designed so that they cannot be modified by end users. Restricted-access operating systems are often referred to as "closed" operating systems. Operating systems are closed to improve stability (i.e., reliable and consistent operation of the mobile wireless communication device) and to reduce maintenance problems caused by untested or non-compliant modifications to the operating systems or the use of application software not specifically designed to operate with the operating system. When mobile wireless communications devices are used in environments where security is a concern (e.g., public safety, military, and government), closed operating systems are used to maintain appropriate security.

Despite the closed nature of the operating systems, it is still possible for end users to modify an operating system using specialized equipment and software (e.g., "jail breaking," and "rooting"). Once an operating system has been modified, unauthorized software can be installed, which can lead to reduced system stability and reduced security.

Accordingly, there is a need for a method for monitoring an operating system of a mobile wireless communication device for unauthorized modifications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
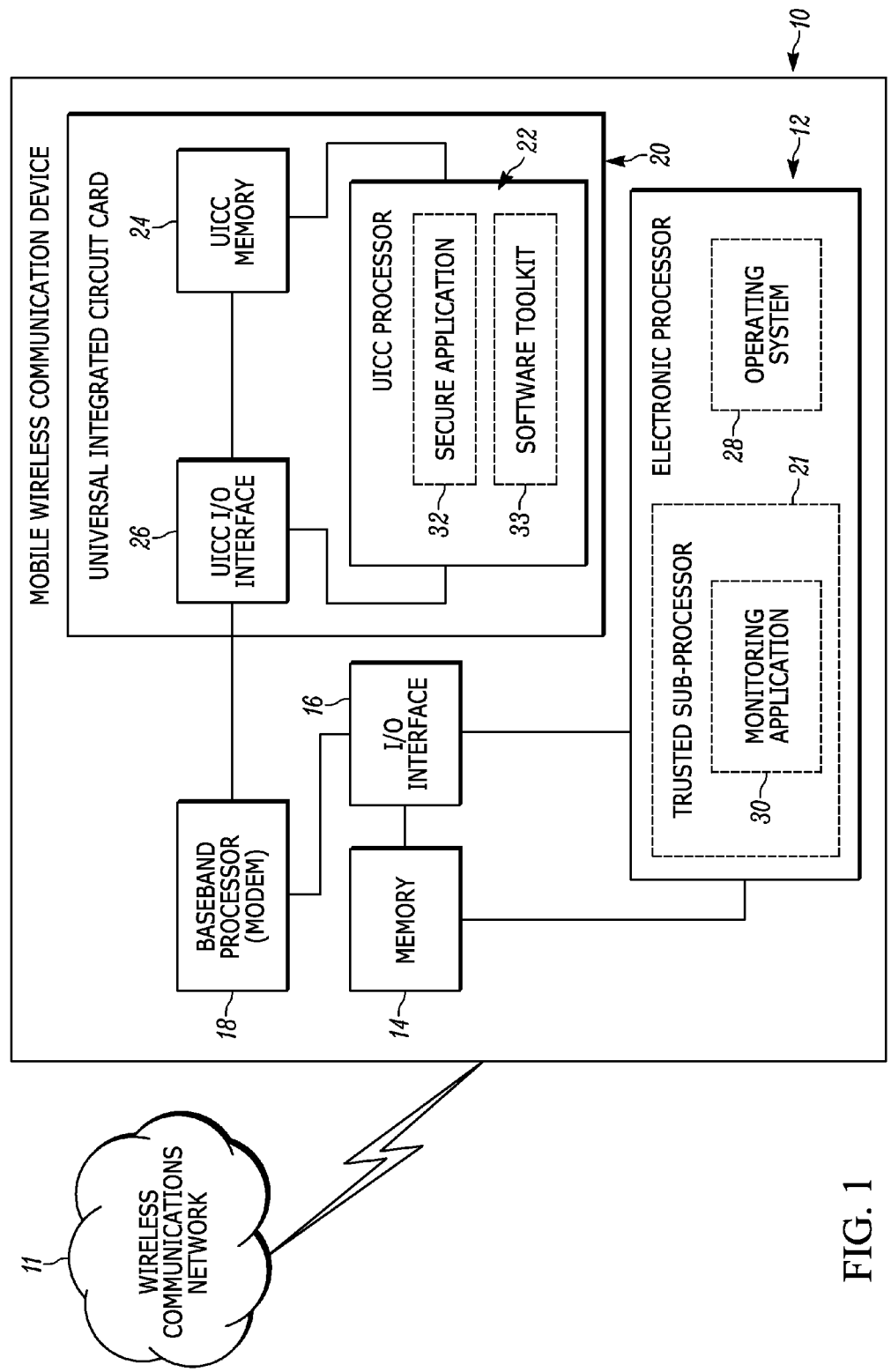
FIG. 1 is a block diagram illustrating a mobile wireless communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments of the invention include a method for secure monitoring of an operating system of a mobile wireless communication device for unauthorized modifications. In one embodiment, the method includes providing a secure application on a universal integrated circuit card of the mobile wireless communication device. The secure application is configured to control the wireless connectivity of the mobile wireless communication device, and communicate with a wireless communications network. The method further includes providing a monitoring application in a trusted sub-processor of the processor of the mobile wireless communication device. The method further includes establishing a secure communication link between the secure application and the monitoring application. The method further includes the trusted sub-processor generating a heartbeat token based on a modification status for the operating system and at least one system variable. The method further includes the secure application receiving the heartbeat token, and determining that an unauthorized software modification exists based on the heartbeat token. The method further includes the secure application activating at least one countermeasure. Some embodiments of the invention include a system for secure monitoring of the operating system of a mobile wireless communication device for unauthorized modifications. In one such embodiment, the system includes a universal integrated circuit card and an electronic processor. The universal integrated circuit card is configured to control wireless connectivity of the mobile wireless communication device, and communicate with a wireless communications network. The electronic processor includes a trusted sub-processor, which is configured to establish a secure communication link between the trusted sub-processor and the universal integrated circuit card. The trusted sub-processor is further configured to generate a heartbeat token based on a modification status for the operating system and at least one system variable. The universal integrated circuit card is further configured to receive the heartbeat token from the trusted sub-processor, determine that an unauthorized software modification exists based on the heartbeat token, and activate at least one countermeasure.

As illustrated in FIG. 1, the mobile wireless communication device 10 includes an electronic processor 12 (e.g., a microprocessor or another suitable programmable device), a memory 14 (e.g., a computer-readable storage medium), an input/output interface 16, a baseband processor 18 (e.g., a network modem), and a universal integrated circuit card (UICC) 20. The mobile wireless communication device 10 is capable of terminating and originating voice calls, data information, and text messages over a wireless communications network 11 (e.g., a cellular network or other wireless network). In many of the embodiments described herein, the mobile wireless communication device 10 is a smart telephone. However, in alternative embodiments, the mobile wireless communication device 10 may be a cellular telephone, a smart watch, a tablet computer, a personal digital assistant (PDA), a portable radio, or other device that includes or is capable of being coupled to a network modem or components to enable wireless network communications (such as an amplifier, antenna, etc.) on cellular, land mobile, or other wireless communication networks.

The electronic processor 12, the memory 14, the input/output interface 16, the baseband processor 18, and the universal integrated circuit card 20, as well as other various modules and components, are coupled by one or more control or data buses to enable communication therebetween. The memory 14 may include a program storage area (e.g., read only memory (ROM) and a data storage area (e.g., random access memory (RAM), and another non-transitory computer readable medium. The electronic processor 12 is connected to the memory 14 and executes computer readable instructions ("software") stored in the memory 14. For example, software for placing and receiving calls, and detecting and reporting unauthorized software modification, as described below, may be stored in the memory 14. The software may include one or more applications, program data, filters, rules, one or more program modules, and/or other executable instructions. The electronic processor 12 includes a trusted sub-processor 21, which provides secure, isolated operating environment within the electronic processor 12. The trusted sub-processor 21 may be implemented as a trusted execution environment, either in hardware, software, or a combination of both. The trusted sub-processor 21 is configured to execute trusted software isolated from the main portion of the electronic processor 12.

The input/output interface 16 operates to receive user input, to provide system output, or a combination of both. User input may be provided via, for example, a keypad, a touch screen, a scroll ball, buttons, and the like. System output may be provided via a display device such as a liquid crystal display (LCD), touch screen, and the like (not shown). The input/output interface 16 may include a graphical user interface (GUI) (e.g., generated by the electronic processor 12, from instructions and data stored in the memory 14, and presented on a touch screen) that enables a user to interact with the mobile wireless communication device 10.

The baseband processor 18 is configured to encode and decode digital data sent and received by a radio transceiver (not shown), and to communicate the data to and from the electronic processor 12 and the universal integrated circuit card 20.

The universal integrated circuit card (UICC) 20 is a self-contained computer on a chip and includes a UICC processor 22, a UICC memory 24, and a UICC input/output interface 26. The UICC processor 22, the UICC memory 24, and the UICC input/output interface 26, as well as other various modules and components, are connected by one or more control or data buses to enable communication between the modules and components. The UICC memory 24 may include a program storage area and a data storage area. The UICC processor 22 is connected to the UICC memory 24 and retrieves and executes computer readable instructions ("software") stored in the UICC memory 24. The software includes, for example, a software toolkit 33 (e.g., the "subscriber identification module (SIM) Application Toolkit") that enables communication between applications running on the electronic processor 12 and the universal integrated circuit card 20. The UICC memory 24 may also include various access credentials that the mobile wireless communication device 10 may need to communicate using the wireless communications network 11.

The UICC input/output interface 26 is electrically connected to the baseband processor 18. The UICC processor 22 communicates over this connection with other components of the mobile wireless communication device 10 to send and receive data, including, for example, access credentials for the wireless communications network 11. The universal integrated circuit card 20 is removable from the mobile wireless communication device 10. However, full operation of the mobile wireless communication device 10 requires the presence of the universal integrated circuit card 20 so that the various access credentials in the universal integrated circuit card 20 are available for authentication processes made prior to or during communications carried out using the wireless communications network 11.

The electronic processor 12 executes or runs the operating system 28 and the monitoring application 30. The UICC processor 22 runs or executes the secure application 32. In alternative embodiments, the operating system 28, the monitoring application 30, and the secure application 32 may be executed by different processors, or as separate modules from their respective processors. The operating system 28 manages the hardware and software resources of the mobile wireless communication device 10, and serves as an interface between user applications (i.e., "apps") and the hardware and software resources. The monitoring application 30 is configured to operate within the trusted sub-processor 21 of the electronic processor 12. Accordingly, the monitoring application 30 may access the operating system 28, but the operating system 28 may not access or modify the monitoring application 30. The monitoring application 30 monitors the operating system 28 and detects unauthorized modifications to the operating system 28, including, for example, when the security measures of the operating system 28 have been compromised or overridden by "rooting," or "jail breaking." However, it may not be possible for the monitoring application 30 to report the unauthorized modifications that it detects because the monitoring application 30 is isolated, and cannot directly access the baseband processor 18 of the mobile wireless communication device 10. In addition, the operating system 28 cannot be trusted, because the unauthorized modifications to the operating system 28 may include changing the way it receives and responds to commands from software, including the monitoring application 30. For example, the monitoring application 30 may believe that it has successfully reported the unauthorized modification, when in actuality the reporting message has been accepted and subsequently deleted (e.g., by the modified portions of the operating system 28). The monitoring application 30 is configured to communicate with the secure application 32. The secure application 32, in turn, is configured to communicate with the monitoring application 30.

Figure 2:
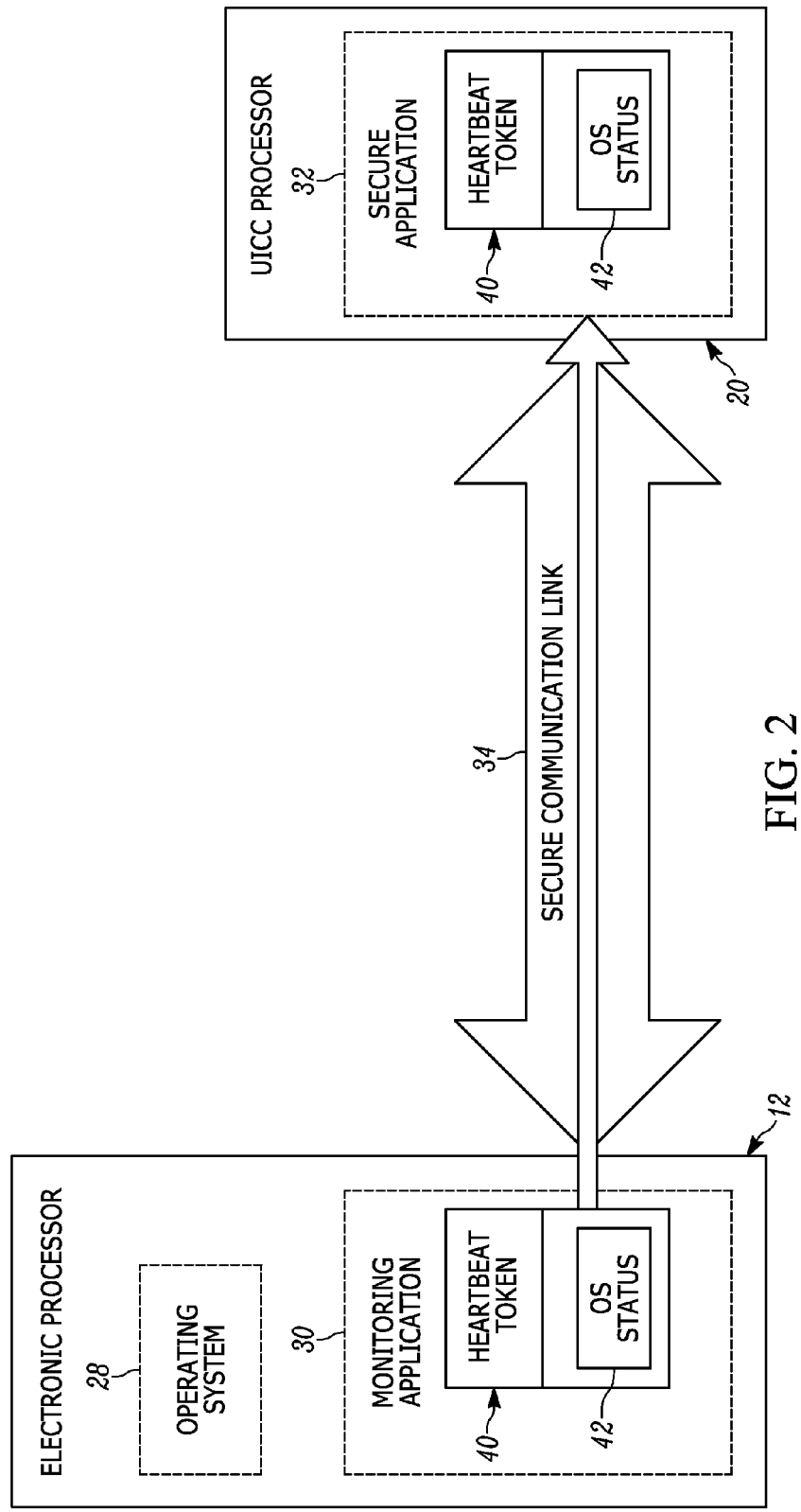
FIG. 2 is a block diagram illustrating the internal communications of the mobile wireless communication device of FIG. 1 in accordance with some embodiments.

As illustrated in FIG. 2, the communications between the monitoring application 30 and the secure application 32 take place over a secure communication link 34. The secure communication link 34 is established securely using suitable network protocols. In one exemplary embodiment, (not shown) the universal integrated circuit card 20 includes a smart card web server (SCWS), which operates to communicate with external components, including, for example, the electronic processor 12, using the bearer independent protocol ("BIP"). The secure communication link 34 may be established using the smart card web server and the hypertext transfer protocol over secure sockets layer ("https"). The secure communication link 34 is secured using a shared key, which is provided by the wireless service provider, and stored in the monitoring application 30 and the universal integrated circuit card 20 when the mobile wireless communication device 10 is initially provisioned. The shared key may be updated when the universal integrated circuit card 20 is replaced. The monitoring application 30 generates a heartbeat token 40, and an OS (operating system) status message 42. The heartbeat token 40 includes the OS status message 42. The OS status message 42 indicates whether the operating system 28 has been modified. The heartbeat token 40 may be transmitted over the secure communication link 34 to the secure application 32.

Figure 3:
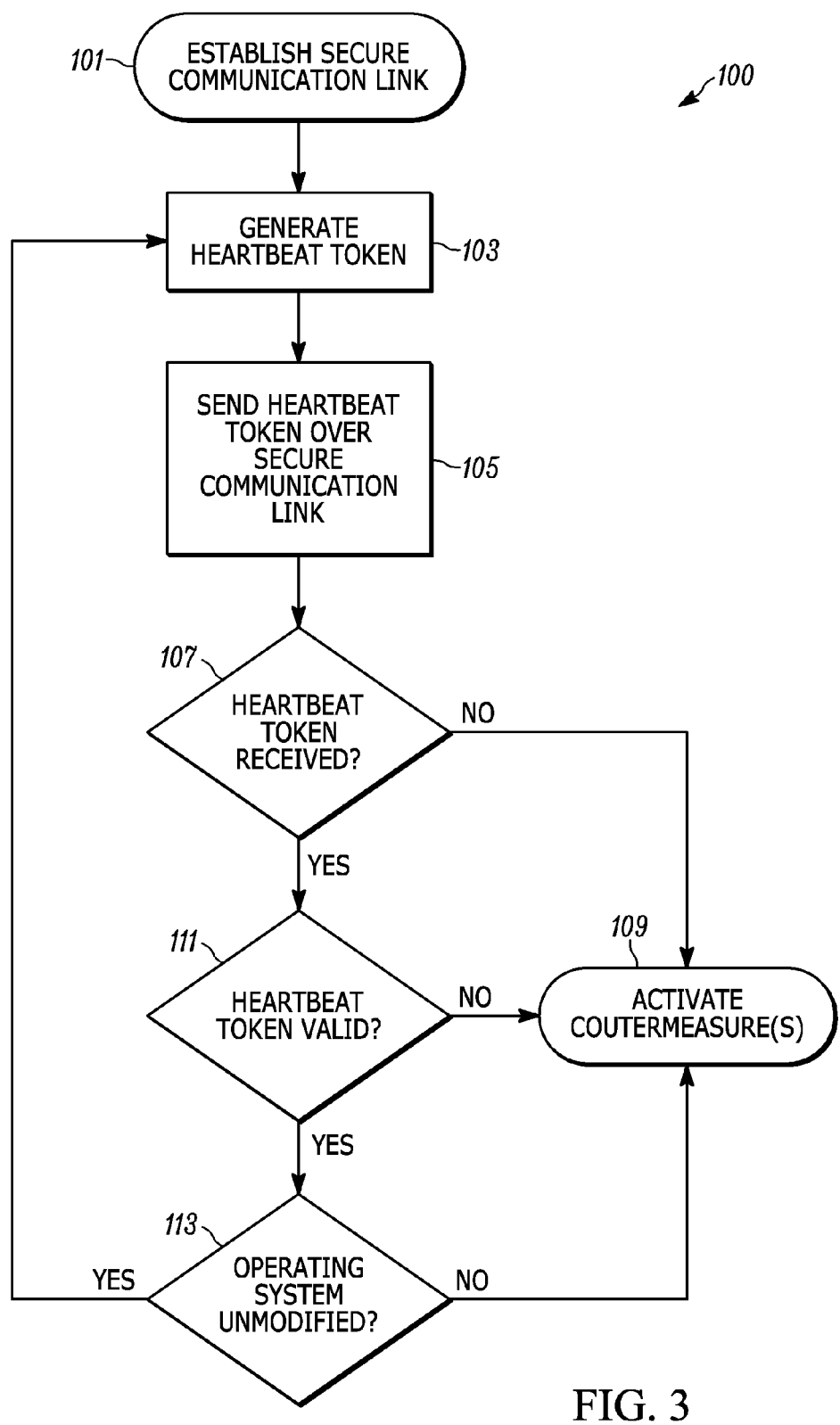
FIG. 3 illustrates a method for monitoring an operating system of a mobile wireless communication device for unauthorized modifications in accordance with some embodiments.

FIG. 3 is a flowchart of an exemplary method 100 for monitoring an operating system of a mobile wireless communication device 10 for unauthorized modifications. At block 101, the monitoring application 30 establishes a secure communication link 34 with the secure application 32 on the universal integrated circuit card 20.

At block 103, the monitoring application 30 generates a heartbeat token 40. The heartbeat token 40 includes the OS status message 42, and one or more system variables, including, for example, the temporary mobile subscriber identity ("TMSI"), the location area identity ("LAI"), and the international mobile subscriber identity ("IMSI"). The temporary mobile subscriber identity is the temporary identifier of the mobile wireless communication device's 10 connection to the wireless communications network 11. The location area identity identifies the current location of the mobile wireless communication device 10. The international mobile subscriber identity is an identifier unique to the mobile wireless communication device 10 across all wireless networks. In some embodiments, a keyed-hash message authentication code algorithm (e.g., HMAC-SHA256) is used to generate a heartbeat token 40, which includes the OS status message 42, a shared key, the system variables, and a message authentication code.

At block 105, the monitoring application 30 sends the heartbeat token 40 to the secure application 32 using, for example, an hypertext transfer protocol (HTTP) "put" command. The secure application 32 expects to see a heartbeat token 40 periodically. At block 107, when the secure application 32 has not received a heartbeat token 40 within the determined period, then the secure application 32 activates one or more countermeasures. Countermeasures are described in more detail below. However, when a heartbeat token 40 is received, then the secure application 32 processes the heartbeat token 40 with a keyed-hash message authentication code algorithm, and determines whether the keyed-hash message authentication code is valid at block 111.

In some embodiments, the secure application 32 uses the message authentication code to determine if the heartbeat token 40 is valid, and the OS status message 42 can be trusted. In alternative embodiments, the check for validity is based on the system variables, to guard against a replay attack. A replay attack occurs when software intercepts a valid message, and continues to send copies of the valid message after the software changes the conditions that generate the valid message. For example, unauthorized software could intercept the heartbeat token 40 containing an OS status message 42 indicating that operating system 28 is unmodified. This unauthorized software could modify the operating system 28, and then replay (i.e., continue sending copies of) the intercepted heartbeat token 40 to the secure application 32, causing the secure application 32 to believe that the operating system 28 is unmodified. The inclusion of system variables in the heartbeat token 40 prevents this type of replay attack. The international mobile subscriber identity value may be altered by unauthorized software, but the international mobile subscriber identity value stored on the universal integrated circuit card 20 cannot be altered by software on the mobile wireless communication device 10. Additionally, both the temporary mobile subscriber identity and the location area identity change over time as the mobile wireless communication device 10 moves or is connected to and disconnected from the wireless communications network 11. In one exemplary embodiment, the secure application 32 decrypts the heartbeat token 40 and compares the system variables with their current values. When the values match, then the secure application 32 may infer that the heartbeat token 40 is valid and the OS status message 42 can be trusted. In some embodiments, the secure application 32 may require more than one heartbeat token 40 with mismatched system variable values before it infers that the heartbeat token 40 is invalid. Some embodiments use both the message authentication code and the system variable comparisons to determine the validity of the heartbeat token 40. When the secure application 32 determines that the heartbeat token 40 is invalid, then the secure application 32 activates one or more countermeasures at block 109.

When the secure application 32 determines that the heartbeat token 40 is valid at block 111, it will then check the OS status message 42 at block 113. In some embodiments, the OS status message 42 may consist of a single bit. For example, a value of '0' may indicate that the operating system 28 is unmodified (i.e., the status is 'OK'), while a value of '1' may indicate that the operating system 28 has been modified. In alternative embodiments, the OS status message 42 may be formatted differently, or may contain more information, including, for example, data identifying what modifications were detected and other information, which would be useful in identifying the source or nature of the modifications. When the secure application 32 determines, from the OS status message 42, that the operating system 28 is unmodified, then the process begins again with the generation of another heartbeat token at block 103. When the secure application 32 determines, from the OS status message 42, that the operating system 28 has been modified, then the secure application 32 will activate one or more countermeasures at block 109.

As noted above, unauthorized modifications to the operating system 28 may result in unstable operation of the mobile wireless communication device 10, compromise the security of the mobile wireless communication device 10, or both. Accordingly, countermeasures may be activated at block 109 of the method 100. In some embodiments, the secure application 32 disables the user-accessible wireless services on the mobile wireless communication device 10, preventing the modified operating system 28 or any unauthorized software from accessing the wireless communications network 11. To disable the user-accessible wireless services, the secure application 32 blocks cellular communications for everything except the universal integrated circuit card 20. Disabling the user-accessible wireless services prevents the unauthorized software from causing harm to the wireless communications network 11, or transmitting secure data from the mobile wireless communication device 10. In other embodiments, the secure application 32 sends a message to the wireless communications network 11. The message may include the international mobile subscriber identity, or the international mobile equipment identity ("IMEI") for the mobile wireless communication device 10, and an indication that the operating system 28 has been modified. Alternative embodiments may include other types of countermeasures. For example, the secure application 32 may disable other wireless services on the mobile wireless communication device 10 (e.g., Wi-Fi and Bluetooth). Some embodiments include a combination, or all, of the countermeasures described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for secure monitoring an operating system of a mobile wireless communication device for unauthorized modifications, the mobile wireless communication device including an electronic processor and a universal integrated circuit card, the method comprising:
   providing a secure application in the universal integrated circuit card, the secure application configured to disable or block wireless connectivity of the mobile wireless communication device, and communicate with a wireless communications network;
   providing a monitoring application in a trusted subprocessor of the electronic processor;
   establishing a secure communication link between the secure application and the monitoring application;
   generating a heartbeat token based on a modification status and at least one system variable selected from the group consisting of a temporary mobile subscriber identity, a location area identity, and an international mobile subscriber identity; and
   receiving, with the secure application, the heartbeat token.

2. The method of claim 1, wherein generating the heartbeat token includes generating the heartbeat token further based on a message authentication code.

3. The method of claim 1, further comprising:
   determining, with the secure application, that an unauthorized software modification exists based on the heartbeat token; and
   activating, with the secure application, at least one countermeasure.

4. The method of claim 3, wherein determining that the unauthorized software modification exists includes verifying a message authentication code.

5. The method of claim 3, wherein activating the at least one countermeasure includes selecting the at least one countermeasure from the group consisting of sending a message to the wireless communications network, and disabling user-accessible wireless services on the mobile wireless communication device.

6. The method of claim 1, further comprising:
   determining, with the secure application, that an unauthorized software modification exists when the heartbeat token is not received; and
   activating, with the secure application, at least one countermeasure.

7. The method of claim 6, wherein activating the at least one countermeasure includes selecting the at least one countermeasure from the group consisting of sending a message to the wireless communications network, and disabling user-accessible wireless services on the mobile wireless communication device.

8. A system for secure monitoring of an operating system of a mobile wireless communication device for unauthorized modifications, the system comprising:
   a universal integrated circuit card configured to
      disable or block wireless connectivity of the mobile wireless communication device, and communicate with a wireless communications network; and
      receive a heartbeat token; and
   an electronic processor having a trusted sub-processor, the trusted sub-processor configured to
      establish a secure communication link between the trusted sub-processor and the universal integrated circuit card; and
      generate the heartbeat token based on a modification status and at least one system variable selected from the group consisting of a temporary mobile subscriber identity, a location area identity, and an international mobile subscriber identity.

9. The system of claim 8, wherein the trusted sub-processor is further configured to generate a message authentication code; and wherein generating the heartbeat token includes generating the heartbeat token further based on the message authentication code.

10. The system of claim 8, wherein the universal integrated circuit card is further configured to determine that an unauthorized software modification exists based on the heartbeat token; and
    activate at least one countermeasure.

11. The system of claim 10, wherein determining that the unauthorized software modification exists includes verifying a message authentication code.

12. The system of claim 10, wherein the at least one countermeasure includes at least one selected from the group consisting of sending a message to the wireless communications network, and disabling user-accessible wireless services on the mobile wireless communication device.

13. The system of claim 8, wherein the universal integrated circuit card is further configured to determine that an unauthorized software modification exists when the heartbeat token is not received; and
    activate at least one countermeasure.

14. The system of claim 13, wherein the at least one countermeasure includes at least one selected from the group consisting of sending a message to the wireless communications network, and disabling user-accessible wireless services on the mobile wireless communication device.

15. A system for secure monitoring of an operating system of a mobile wireless communication device for unauthorized modifications, the system comprising:
    a universal integrated circuit card that disables or blocks wireless connectivity of the mobile wireless communication device, communicates with a wireless communications network, and receive a heartbeat token; and
    an electronic processor having a trusted sub-processor, that establishes a secure communication link between the trusted sub-processor and the universal integrated circuit card, and generates the heartbeat token based on a modification status and at least one system variable selected from the group consisting of a temporary mobile subscriber identity, a location area identity, and an international mobile subscriber identity.

* * * * *